United States Patent

[11] 3,543,795

| [72] | Inventor | Jackson T. Schwindt<br>12507 W. Mississippi Ave., Denver,<br>Colorado 80226 |
|---|---|---|
| [21] | Appl. No. | 693,482 |
| [22] | Filed | Dec. 26, 1967 |
| [45] | Patented | Dec. 1, 1970 |

[54] HYDRAULIC TIMER VALVE AND ACTUATOR THEREFOR
8 Claims, 2 Drawing Figs.

[52] U.S. Cl. .................................................. 137/624.18;
251/44
[51] Int. Cl. ............................................. F16k 21/12
[50] Field of Search........................................... 137/624.18;
251/22, 42, 44, 41, 43; 637/613(Inquired); 138/45

[56] References Cited
UNITED STATES PATENTS

| 1,959,955 | 5/1934 | Hedges | 251/22X |
| 2,164,760 | 7/1939 | Wesson | 251/44X |
| 2,216,571 | 10/1940 | Mikalsen | 251/41X |
| 2,921,629 | 1/1960 | Stout | 137/624.18X |
| 3,003,514 | 10/1961 | Furlong | 137/624.18X |
| 3,386,460 | 6/1968 | Dean | 137/624.18X |
| 3,008,683 | 11/1961 | Filliung | 251/42X |
| 3,141,477 | 7/1964 | Campbell | 138/45 |
| 3,241,804 | 3/1966 | Bjorklund | 251/41 |

Primary Examiner—Harold W. Weakley
Attorney—Jack M. Miller

ABSTRACT: A hydraulic timing valve including a generally cylindrical and hollow housing and a valve member which is operative to reciprocate between a valve seat in one end of the housing and a timing chamber in the other end to control the flow of fluid from the inlet to the outlet of the valve. Small droplets of water are metered from the valve inlet through an orifice in the valve member at a fixed rate into the timing chamber thereby exerting pressure on the valve member to continually push it into seating relationship with the valve seat to thereby close the valve. The cap of the timer valve, which defines one end of the timing chamber, is adjustable for determining the time setting of the valve. In addition, an automatic valve actuator is provided to trigger the operation of a second timer valve upon the shutting off of the first timer valve.

Patented Dec. 1, 1970

3,543,795

INVENTOR.
JACKSON T. SCHWINDT
BY
ATTORNEY 3,543,795

HYDRAULIC TIMER VALVE AND ACTUATOR THEREFOR

BACKGROUND OF THE INVENTION

1. Field of the Invention

The present invention relates to hydraulic timer valves and automatic actuators therefor and, more particularly, to hydraulic timer valves in which the time setting thereof may be adjusted over a large range with a high degree of accuracy and repeatability.

2. Description of the Prior Art

Many uses presently exist for hydraulic timer valves, probably the most common of which is as flushing valves adapted for use in connection with lavatories and similar types of sanitary apparatus. However, these valves have many other uses such as in automatic faucets, automatic sprinkling systems, and many industrial and commercial uses in which the manual opening and automatic shutoff of a valve is required.

Substantially all automatic timer valves are operative, upon activation to provide a predetermined amount of water flow from the inlet to the outlet of the valve and to be automatically shut off thereafter. This is generally accomplished by arranging a timing member within the valve body so that after the flow of a predetermined amount of water through the valve, the valve automatically closes. One such timing valve is disclosed in U.S. Pat. No. 2,672,888 to Shields and comprises a cap, a valve body, a valve member and an operator. The lower end of the valve member, in its closed position, seats on an annular seat of the valve body. With the operator closed and the valve open, liquid flows through a vertical bore in the valve member into a timing chamber above the valve member forcing the valve member downwardly into seating relationship with the annular seat thereby closing the valve. In order to open the valve, the operator is advanced out of seating relationship with a passageway which joins the timing chamber and the valve outlet. In this manner, liquid from the timing chamber is exhausted through the passageway into the outlet. The line pressure at the inlet forces the lower end of the valve out of contact with the annular seat thereby opening the valve. When the operator is again closed, the procedure repeats.

Such a hydraulic timer valve is effective for use in connection with lavatories and similar types of sanitary apparatus or with automatic faucets where the time duration of valve operation is fixed and where the accuracy of the time duration is relatively unimportant. However, many situations exist where it is desirable or necessary to be able to vary and accurately control the time setting of the valve. For example, if such a valve were to be used in connection with an automatic sprinkler system, it would be desirable if the time setting of the valve could be adjusted depending upon the soil condition so that a proper amount of water could be provided thereto. In such a situation, the ability to vary the time setting of the valve over a wide range would be a highly useful feature. Furthermore, although in such a situation the accuracy and repeatability of the time setting is not crucial, many commercial and industrial uses require a high degree of accuracy and repeatability.

Finally, for many uses, such as in connection with automatic sprinkler systems, it is desirable to be able to control the activation of a second timer valve automatically in response to the shutting off of a first valve. For example, in a situation where several parcels of land are to be watered and the water pressure is only sufficient to water one parcel at a time, it would be desirable if the hydraulic timer valve for each parcel could be operated automatically in response to a prior timer valve shutting off.

Numerous types of hydraulic timer valves presently exist which are manually started and automatically shut off after providing a predetermined flow of water for a desired period of time. However, none of the existing timer valves permit the accurate adjustment of the time setting thereof over a wide range, such as from several minutes to an hour or more, with a high degree of repeatability. In addition, no known timer valve includes means for automatically activating a second valve in response to the shutting off of a first valve.

SUMMARY OF THE INVENTION

In accordance with the present invention, there is provided a hydraulic timer valve which completely eliminates the problems associated with existing timer valves. As is the case with many existing timer valves, the present timer valve includes a cap, a valve body, a valve member and a starting mechanism. The valve member is operative to reciprocate within the valve body, the lower end of the valve member, in its closed position, seating on an annular seat of the valve body to cut off the flow of water. In addition, the upper end of the valve member, in its open position, is in contact with the lower end of the valve cap, with the lower end of the valve member displaced from the annular seat of the valve body so as to permit the flow of water. However, in accordance with the present invention, the position of the valve cap is made adjustable so as to permit variation of the volume of the timing chamber which is defined as the area between the upper end of the valve member and the lower end of the valve cap. In this manner, by the relatively simple expedient of rotating the valve cap, the time setting of the valve may be accurately adjusted within a range of a few minutes to an hour or more. In addition, the present automatic timer valve includes a metering technique in which small droplets or pulses of water are bled through an orifice in the valve member to permit water to flow from the bottom end of the valve member into the timing chamber. This unique metering technique permits the time setting of the valve to be extremely accurate and guarantees a high degree of repeatability in valve operation.

In addition, and also in accordance with the teachings of the present invention, there is provided an automatic valve actuator which monitors the operation of the first automatic timer valve to determine when the valve shuts off whereupon the automatic valve actuator is operative to turn on a second hydraulic timer valve which will then operate in the same manner as the first hydraulic timer valve.

OBJECTS

It is therefore an object of the present invention to provide a novel hydraulic timer valve.

It is a further object of the present invention to provide a hydraulic timer valve in which the time setting thereof is adjustable over a wide range.

It is a still further object of the present invention to provide a hydraulic timer valve in which the time setting thereof is manually adjustable by rotating the valve cap.

It is another object of the present invention to provide a hydraulic timer valve in which the time setting thereof may be adjusted and repeated with a high degree of accuracy.

It is still another object of the present invention to provide a hydraulic timer valve in which pulses of water are bled through an orifice at a fixed rate to control the time duration of the valve operation.

Another object of the present invention is the provision of a valve actuator for a timer valve which will automatically open a second valve upon the closing of a first valve.

Still other objects, features and attendant advantages of the present invention will become apparent to those skilled in the art from a reading of the following detailed description of a preferred embodiment constructed in accordance therewith, taken in conjunction with the accompanying drawings wherein:

DESCRIPTION OF THE PREFERRED EMBODIMENT

Figure 1:
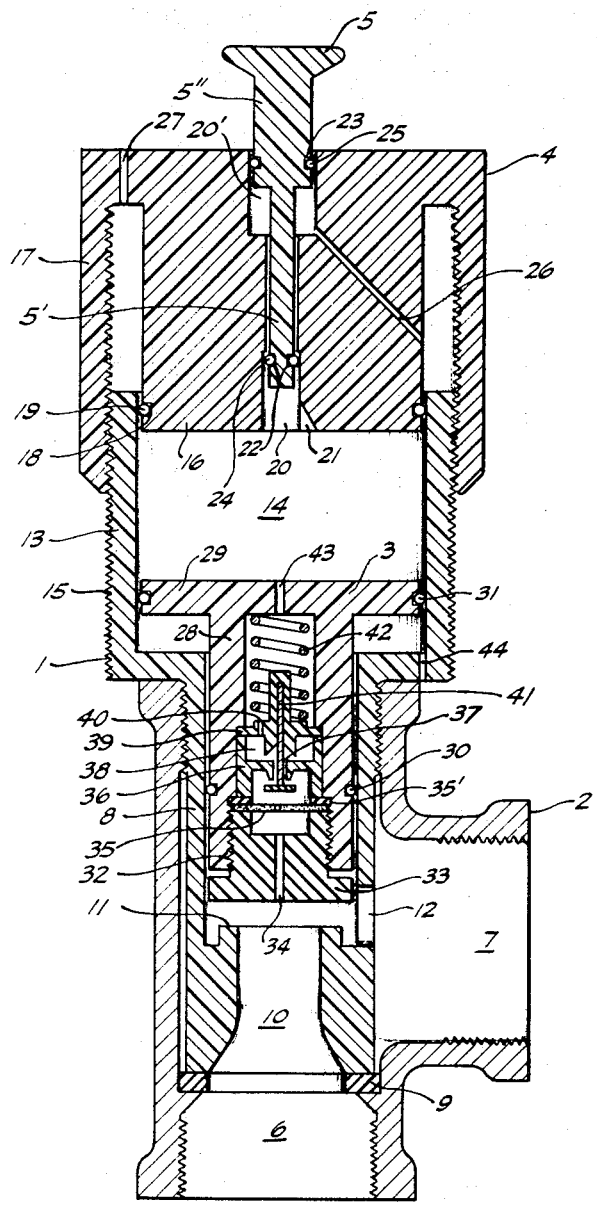
FIG. 1 is a cross-sectional view of the present hydraulic timer valve.

Referring now to the drawings and, more particularly, to FIG. 1 thereof, there is shown a cross-sectional view of the present hydraulic timer valve. The timer valve consists of a timer housing 1 which is threadedly connected with a conventional T-section 2, a valve member 3, a valve cap 4, and a start pushbutton 5. T-section 2, which may be made of bronze or any other metal or plastic, has an inlet 6 and an outlet 7. The lowermost half of housing 1, which may be made of any suitable plastic, consists of a cylindrical portion 8, the bottom end of which makes contact with a washer 9 which provides a seal between housing 1 and T-section 2. The lower end of cylindrical portion 8 is centrally bored so as to provide an entrance passageway 10. In addition, cylindrical portion is provided with an aperture 12 in the side thereof whereby water may flow from inlet 6 to outlet 7. Also, cylindrical portion 8 contains an annular valve seat 11 for receiving the lower end of valve member 3 to close off entrance passageway 10 from aperture 12 and outlet 7. The area of timer housing 1 above valve seat 11 is also centrally bored to provide a cylinder within which valve member 3 may reciprocate. Lower cylindrical portion 8 of timer housing 1 merges into an upper cylindrical portion 13 of large diameter which contains a timing chamber 14. Upper cylindrical portion 13 is externally threaded at 15.

Valve cap 4, which may also be made of plastic, includes an inner cylindrical portion 16 and an outer portion 17. The outside diameter of inner cylindrical portion 16 is slightly less than the inside diameter of upper cylindrical portion 13 so that inner cylindrical portion 16 fits within upper cylindrical portion 13 of timer housing 1. Fluidtight mating between inner cylindrical portion 16 of valve cap 4 and upper cylindrical portion 13 of timer housing 1 is achieved by cutting a groove 18 in the periphery of inner cylindrical portion 16 for reception of an O-ring seal member 19.

The interior of outer annular portion 17 of cap 4 is internally threaded so as to engage with threads 15 of upper cylindrical portion 13 of timer housing 1 whereby cap 4 may be screwed into place closing the upper end of timing chamber 14. Valve cap 4 is also provided with a cylindrical bore 20 at the bottom thereof and an increased diameter cylindrical bore 20' at the top for receiving start pushbutton 5. Start pushbutton 5, which may also be made of plastic, consists of a lower cylindrical portion 5', the outside diameter of which is slightly less than the diameter of bore 20 and an upper cylindrical portion 5'', the outside diameter of which is slightly less than the diameter of bore 20'. Fluidtight mating between portions 5' and 5'' and portion 16 of cap 4 is achieved by providing start pushbutton 5 with a pair of grooves 22 and 23 in the peripheries of portions 5' and 5'', respectively, for receiving a pair of O-ring seal members 24 and 25, respectively. Valve cap 4 is also provided with a bypass 21 at the lower end of bore 20 and a bleed-off passage 26 through inner cylindrical portion 16 whereby when start pushbutton 5 is in its lowermost position, water from timing chamber 14 flows past O-ring 24 through bleed-off passage 26 to the air space between inner cylindrical portion 16 and outer annular portion 17 of cap 4. The water which accumulates in the air space may escape by seeping past threads 15 or cap 4 may be provided with a second bleed-off passage 27 to permit the water flowing through passage 26 to exit to the atmosphere.

Valve member 3 consists of a cylindrical body portion 28, the outside diameter of which is slightly less than the inner diameter of lower cylindrical portion 8 of timer housing 1, and an increased diameter upper cylindrical portion 29 whose outer diameter is slightly less than the inner diameter of upper cylindrical portion 13 of timer housing 1. Portions 28 and 29 may be made from a single piece of plastic or any other suitable material. A pair of grooves are cut in the peripheries of body portion 28 and upper portion 29 to receive a pair of O-rings, 30 and 31, respectively. The bottom end of cylindrical body portion 28 is provided with internal threads 32 which engage with the external threads of a cylindrical member 33 which operates as the seat of valve member 3. Seat member 33, which may be made of rubber, is provided with an inlet orifice 34 which permits water to flow from entrance passageway 10 into the internal portion of cylindrical body portion 28 of valve member 3. A filter 35 is provided at the upper end of the seat member 33 to prevent dirt particles from flowing through valve member 3. A gasket 35' may be located immediately above filter 35 so that seat member 33 and filter 35 may be tightly engaged with a cylindrical member 36, made of plastic and located within body portion 38, which provides a passageway 37 through which the water passing through filter 35 may enter a reduced pressure chamber 38. Reduced pressure chamber 38 is sealed at its upper end by a resilient diaphragm 39, which may be made of rubber, having a very small orifice 40 therein. Diaphragm 39 supports a valve 41 which may be made of stainless steel and which is operative to periodically seal off passageway 37, as will be explained more fully hereinafter. Valve 41 is normally held in its open position by the operation of a spring 42, also made of stainless steel, located between diaphragm 39 and the lower surface of upper portion 29 of valve member 3. Upper portion 29 of valve member 3 has an orifice 43 therein to permit water flowing through orifice 40 to pass to timing chamber 14. Finally, timer housing 1 is provided with an air vent 44 so that valve member 3 may freely reciprocate in and out of timing chamber 14.

In operation, the timer valve is shown in FIG. 1 in its open position about to close. In the closed position, seat member 33 is tightly fitted against annular valve seat 11. Timing chamber 14 is full of water at the pressure of pipe inlet 6.

To open the valve and initiate operation thereof, start pushbutton 5 is pushed all the way down. When this occurs, the water in timing chamber 14 exhausts through pushbutton bypass 21 and bleed-off passages 26 and 27. Since at this time timing chamber 14 is connected to atmospheric pressure, the higher pressure at inlet 6 acts against the bottom of seat member 33 pushing valve member 3 upwardly until upper portion 29 engages with inner cylindrical portion 16 of cap 4.

It can now be seen that by the simple expedient of turning cap 4 to the desired setting, the size of timing chamber 14 may be adjusted. Each revolution of cap 4, outwardly, increases the size of timing chamber 14 by a predetermined amount thereby increasing the volume of water required to fill chamber 14. By increasing the volume of chamber 14, the period of time before the valve closes is increased.

Next, to start the timing cycle, start pushbutton 5 is pulled up. In this position, no water can be bled from timing chamber 14. Water passing through inlet 6 then passes through entrance passageway 10 and into inlet orifice 34. The water passing through inlet orifice 34 is filtered by filter 35 and then passes through passageway 37 into reduced pressure chamber 38. The pressure is reduced in chamber 38 because spring 42 will compress if the pressure gets higher than a predetermined amount. When the pressure in chamber 38 increases, spring 42 compresses thereby pulling valve 41 closed against cylindrical member 36 preventing any more water from flowing into chamber 38. However, at this time, the pressure in chamber 38 is such that the water in chamber 38 bleeds through orifice 40 and upon doing so, lowers the pressure in chamber 38 permitting valve 41 to reopen. This procedure then repeats whereby passageway 37 is periodically opened and closed permitting small droplets of water to bleed through orifice 40 at a fixed rate. The water passing through orifice 40 passes through orifice 43 into timing chamber 14. Upon entering timing chamber 14, the water exerts a pressure on valve member 3, continually pushing it down until seat member 33 is tight against annular valve seat 11, thereby terminating the flow of water.

From an inspection of FIG. 1, it can be seen that if start pushbutton 5 remains down, the valve will never close. However, the valve can be manually closed by screwing down cap 4. In effect, by manually screwing down cap 4, the present hydraulic timer valve can be used for throttling since it will act as a globe valve.

Figure 2:
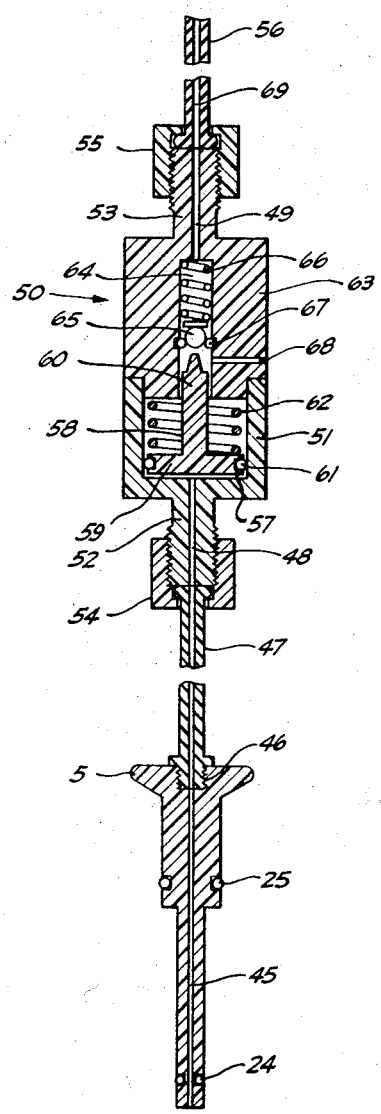
FIG. 2 is a cross-sectional view of the present automatic valve actuator and a cross-sectional view of the start pushbutton of the hydraulic timer valve of FIG. 1 showing its modification for use with the automatic valve actuator.

Referring now to FIG. 2, there is shown a cross-sectional view of the automatic valve actuator of the present invention. FIG. 2 also shows the necessary modifications to start pushbutton 5 for use with the automatic valve actuator.

As shown in FIG. 2, start pushbutton 5 is modified so as to incorporate a passageway 45 through the center thereof. In addition, the uppermost portion of start pushbutton 5 is provided with internal threads 46 so as to receive one end of a piece of tubing 47, which may be made of rubber, and which is operative to connect start pushbutton 5 to the automatic valve actuator, generally designated 50.

Automatic valve actuator 50 comprises a generally cylindrical body portion 51, which may also be made of plastic, having reduced diameter sections 52 and 53 at opposite ends thereof. Reduced diameter sections 52 and 53 are provided with passageways 48 and 49, respectively, and external threads which engage with the threads of a pair of tube clamps 54 and 55, the former of which is operative to connect rubber tubing 47 to reduced diameter section 52, and the latter of which is operative to connect reduced diameter section 53 with a second piece of rubber tubing 56. Cylindrical body portion 51 is hollowed out to provide a piston chamber 57. Located within piston chamber 57 is an actuator piston 58 having a first portion 59, the outside diameter of which is slightly less than the inside diameter of cylindrical body portion 51, and a reduced diameter section 60. A groove is cut in the periphery of portion 59 of actuator piston 58 to receive an O-ring 61. A spring 62 is provided to exert pressure to keep actuator piston 58 toward the inlet side of piston chamber 57.

Valve actuator 50 is further provided with a check valve housing section 63 which is hollowed out to provide a check valve chamber 64, the diameter of which is slightly greater than the diameter of section 60 of piston 58 whereby piston 58 may freely reciprocate in chamber 57. Included in check valve chamber 64 is a check valve 65 and a check valve spring 66 which forces check valve 65 into contact with a check valve O-ring 67, thereby sealing off piston chamber 57 from check valve chamber 64. Check valve housing 63 also includes a bleed-off passage 68 which permits check valve chamber 64 to be connected to the atmosphere, as will be explained more fully hereinafter. Finally, passageway 49 of reduced diameter section 53 communicates with a passageway 69 is rubber tubing 56 which would be connected to a second automatic timer valve in the same manner as rubber tubing 47 is connected to pushbutton 5.

In operation, after the first timer valve closes in the manner described above, the pressure in timing chamber 14 will raise to the pressure at inlet 6. Even after the valve closes, droplets of water will continue to be fed through orifice 40 into timing chamber 14. Since valve member 3 is already in its lowermost position, the additional water passes through passageway 45 in start pushbutton 5, through rubber tubing 47 and reduced diameter section 52 into piston chamber 57. This increased pressure pushes piston 58 away from the inlet side of chamber 57. It should be noted that actuator piston 58 moves slowly since only small drops of water are being fed into piston chamber 57. However, piston 58 soon makes contact with check valve 65 which is under pressure from the second valve through passageways 49 and 69. Check valve 65 is also maintained closed by check valve spring 66. However, when check valve 65 is opened by piston 58, water from the second valve is instantly bled off through passageways 49 and 69 and bleed-off passage 68, thereby opening the second valve. This operation of the second valve is exactly the same as if the start pushbutton thereof were pushed down as explained previously with respect to FIG. 1. This thereby commences the operation of the second timer valve. As actuator piston 58 continues to travel, it soon comes to rest on check valve O-ring 67, thereby sealing off further water which could leak from the second valve through bleed-off passage 68. With the timing chamber of the second valve sealed off, the second valve commences to time.

When the first valve is again actuated by pushbutton 5, the pressure in piston chamber 57 is reduced to atmospheric pressure, hence actuator spring 62 will instantly return piston 58 to its original position. When piston 58 returns to its original position, check valve 65 instantly closes against check valve O-ring 67, thus preventing any water from flowing from the second valve through passageways 49 and 69 and bleed-off passage 68. The second valve is therefore prevented from opening even though the first valve is open and timing. This sequence is repeated when the first valve closes upon completion of timing.

It can now be appreciated that in accordance with the present invention there is provided a novel hydraulic timer valve in which the time setting can be adjusted over a relatively wide range by the simple expedient of rotating timer cap 4 with respect to timer housing 1. The size of timing chamber 14 may be adjusted thereby varying the time it will take to fill timing chamber 14 and close the timer valve. In addition, a highly effective technique is disclosed for permitting pulses of water to be bled through an orifice at a fixed rate into timing chamber 14 to thereby accurately control the timing of the present hydraulic timer valve. Finally, there is provided an automatic valve actuator which is operative, in response to the closing of a first valve, to automatically trigger the timing cycle of a second valve.

While the invention has been described with respect to a preferred physical embodiment constructed in accordance therewith, it will be apparent to those skilled in the art that various modifications and improvements may be made without departing from the scope and spirit of the invention.

I claim:

1. A hydraulic timing valve comprising:

a hollow, elongated valve body having inlet and outlet passages formed therein adjacent one end thereof, the other end thereof having an aperture therein; said valve body being externally threaded adjacent the other end thereof;

a valve member operative to reciprocate within the hollow portion of said valve body from a closed position in which fluid communication between said inlet and outlet passages is prevented and an open position permitting fluid communication between said inlet and outlet passages;

an adjustable cap enclosing said other end of said valve body to form a timing chamber therein, said cap being movable to permit variation of the volume of said timing chamber; said cap comprising an inner portion and an outer portion, said inner portion extending through said aperture into said other end of said valve body, said outer portion being positioned external to said valve body and being internally threaded, the internal threads of said outer portion engaging with the external threads of said valve body;

means for permitting fluid communication between said inlet passage and said timing chamber; and means for exhausting the fluid in said timing chamber to open said valve and start the timing thereof, said exhausting means comprising:

a first passageway extending through said inner portion of said cap, an elongated start member operative to reciprocate within said first passageway, spaced-apart sealing means sealing said start member with respect to said first passageway and mutually enclosing a space, a bypass at one end of said first passageway adjacent said timing chamber, said start member, in its open position, permitting fluid communication between said timing chamber and said space, and a second passageway in said inner portion permitting fluid communication between said space and the atmosphere.

2. The hydraulic timing valve of claim 1 wherein said means for permitting fluid communication between said inlet passage and said timing chamber extends through said valve member.

3. The hydraulic timing valve of claim 1 wherein said means for permitting fluid communication between said inlet passage and said timing chamber comprises means extending through said valve member for metering pulses of water through said valve member into said timing chamber at a substantially fixed rate.

4. The hydraulic timing valve of claim 3 wherein said means for metering pulses of water through said valve member comprises:
 a first chamber in said valve member, said first chamber being sealed at one end thereof by a resilient diaphragm;
 a third passageway permitting fluid communication between said inlet passage and the other end of said first chamber;
 a valve head supported by said resilient diaphragm, said diaphragm and said valve head being operative to close said third passageway when the pressure in said first chamber reaches a predetermined level; and
 an orifice in said resilient diaphragm, said valve head and said orifice together permitting metered fluid communication between said first chamber and said timing chamber.

5. The hydraulic timing valve of claim 4 wherein water entering said timing chamber exerts pressure on said valve member forcing said valve member into said closed position.

6. A hydraulic timing valve comprising:
 a hollow, elongated valve body having inlet and outlet passages formed therein adjacent one end thereof, the other end thereof having an aperture therein;
 a valve member operative to reciprocate within the hollow portion of said valve body from a closed position in which fluid communication between said inlet and outlet passages is prevented and an open position permitting fluid communication between said inlet and outlet passages;
 an adjustable cap enclosing said other end of said valve body to form a timing chamber therein, said cap being movable to permit variation of the volume of said timing chamber;
 means for permitting fluid communication between said inlet passage and said timing chamber; and
 means for exhausting the fluid in said timing chamber to open said valve and start the timing thereof, said exhausting means comprising means for permitting fluid communication between said timing chamber and the atmosphere, and wherein said means for permitting fluid communication comprises:
 a first chamber in said valve member, said first chamber being sealed at one end thereof by a resilient diaphragm,
 a passageway permitting fluid communication between said inlet passage and the other end of said first said first chamber,
 a valve head supported by said resilient diaphragm, said diaphragm and said valve head being operative to close said passageway when the pressure in said first chamber reaches a predetermined level; and
 an orifice in said resilient diaphragm, said valve head and said orifice together metering pulses of water through said valve member into said timing chamber at a substantially fixed rate.

7. The hydraulic timing valve of claim 6 wherein water entering said timing chamber exerts pressure on said valve member forcing said member into said closed position.

8. In combination:
 first and second hydraulic timing valves, each of said timing valves comprising:
  a hollow, elongated valve body having inlet and outlet passages formed therein adjacent one end thereof, the other end thereof forming a timing chamber; and
  a valve member operative to reciprocate within the hollow portion of said valve body from a closed position in which fluid communication between said inlet and outlet passages is prevented and an open position permitting fluid communication between said inlet and outlet passages;
 means for permitting fluid communication between said inlet passage and said timing chamber;
 means for exhausting the fluid in said timing chamber to open said valve and start the timing thereof; and
 means operatively connected to said first and second timing valves and responsive to the closing of said first valve for automatically starting the timing cycle of said second valve, said means for automatically starting the timing cycle of said second timing valve comprising:
  a body having a chamber therein,
  a piston operative to reciprocate within said chamber between first and second ends thereof,
  means urging said piston toward said first end of said chamber,
  a bleed-off passage in said body for permitting fluid communication between said second end of said chamber and the atmosphere,
  a check valve in said second end of said chamber for preventing fluid communication between said second end and said bleed-off passage, said piston being operative to selectively open said check valve,
  means connecting said second end of said chamber to said timing chamber of said second valve, and
  means connecting said first end of said chamber to said timing chamber of said first valve, whereby fluid from said timing chamber of said first valve, upon the closing of said first valve, urges said piston member into contact with said check valve to open said valve.